United States Patent
Koga

(10) Patent No.: US 8,113,746 B2
(45) Date of Patent: Feb. 14, 2012

(54) CUTTING INSERT, CUTTING TOOL, AND METHOD OF CUTTING WORKPIECE USING THE SAME

(75) Inventor: Kenichirou Koga, Higashiomi (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 13/055,354

(22) PCT Filed: Mar. 15, 2010

(86) PCT No.: PCT/JP2010/054338
§ 371 (c)(1),
(2), (4) Date: Jan. 21, 2011

(87) PCT Pub. No.: WO2010/110110
PCT Pub. Date: Sep. 30, 2010

(65) Prior Publication Data
US 2011/0135407 A1   Jun. 9, 2011

(30) Foreign Application Priority Data
Mar. 27, 2009   (JP) .................................. 2009-078686

(51) Int. Cl.
B23C 5/20 (2006.01)
B23C 5/22 (2006.01)
(52) U.S. Cl. .............................. 407/113; 407/61; 407/48
(58) Field of Classification Search .......... 407/113–116, 407/48, 61; B23C 5/20
See application file for complete search history.

(56) References Cited

U.S. PATENT DOCUMENTS

| | | | | |
|---|---|---|---|---|
| 3,636,602 A | * | 1/1972 | Owen | 407/113 |
| 3,701,187 A | * | 10/1972 | Erkfritz | 407/46 |
| 4,068,976 A | * | 1/1978 | Friedline | 407/114 |
| 4,123,194 A | * | 10/1978 | Cave | 408/221 |
| 4,681,486 A | * | 7/1987 | Hale | 407/114 |
| 5,059,069 A | * | 10/1991 | Lagerberg | 407/113 |
| 5,085,542 A | * | 2/1992 | Nakayama et al. | 407/114 |
| 5,221,164 A | * | 6/1993 | Allaire | 407/113 |

(Continued)

FOREIGN PATENT DOCUMENTS

EP         62621 A2 * 10/1982

(Continued)

*Primary Examiner* — Boyer D Ashley
*Assistant Examiner* — Sara Addisu
(74) *Attorney, Agent, or Firm* — DLA Piper LLP (US)

(57) ABSTRACT

A cutting insert of the present invention includes a side face having an upper concave portion which is located between an upper face and a lower face and extends up to the upper face, and a plurality of divided upper cutting edges which are located at the intersection of the upper face and the side face, and are divided by the upper concave portion. Each of these divided upper cutting edges includes a first end and a second end, and is inclined being closer to the lower face from the first end toward the second end. The plurality of divided upper cutting edges include a first divided upper cutting edge and a second divided upper cutting edge adjacent to each other. When viewed from side, the first end of the second divided upper cutting edge is located above the intersection of an extension line of the first divided upper cutting edge, and a line which passes through the first end of the second divided upper cutting edge and is parallel to the central axis of the cutting insert, and is located at the same position as the second end of the first divided upper cutting edge, or located therebelow. A cutting tool including the cutting insert, and a method of cutting a workpiece by using the cutting tool are also provided.

19 Claims, 12 Drawing Sheets

U.S. PATENT DOCUMENTS

| | | | |
|---|---|---|---|
| 5,549,424 A * | 8/1996 | Bernadic et al. | 407/100 |
| 5,791,832 A * | 8/1998 | Yamayose | 407/113 |
| 6,135,681 A * | 10/2000 | Nuzzi et al. | 408/227 |
| 6,447,218 B1 | 9/2002 | Lagerberg | 407/114 |
| 6,632,051 B1 * | 10/2003 | Wermeister | 407/114 |
| 6,957,933 B2 * | 10/2005 | Pachao-Morbitzer et al. | 407/11 |
| 7,008,145 B2 * | 3/2006 | Astrakhan | 407/35 |
| 7,591,614 B2 * | 9/2009 | Craig | 407/66 |
| 7,611,310 B2 * | 11/2009 | Isaksson | 407/11 |
| 7,802,946 B2 * | 9/2010 | Ishida | 407/113 |
| 7,857,555 B2 * | 12/2010 | Wermeister | 407/101 |
| 7,993,082 B2 * | 8/2011 | Horiike et al. | 407/113 |
| 8,025,465 B2 * | 9/2011 | Ishida | 407/114 |
| 2003/0180103 A1 * | 9/2003 | Nagaya et al. | 407/34 |
| 2004/0109733 A1 * | 6/2004 | Fouquer | 407/113 |
| 2006/0029475 A1 * | 2/2006 | Scherbarth | 407/113 |
| 2006/0045634 A1 * | 3/2006 | Koskinen et al. | 407/40 |
| 2008/0260476 A1 | 10/2008 | Ishida | 407/114 |
| 2009/0162154 A1 * | 6/2009 | Jonsson et al. | 407/114 |
| 2009/0188356 A1 * | 7/2009 | Ishida | 83/53 |
| 2009/0249926 A1 * | 10/2009 | Serwuschok | 82/1.11 |
| 2010/0092253 A1 * | 4/2010 | Ishida | 407/42 |
| 2010/0272525 A1 * | 10/2010 | Corbin | 407/113 |
| 2011/0038677 A1 * | 2/2011 | Sung et al. | 407/48 |
| 2011/0170963 A1 * | 7/2011 | Smilovici et al. | 407/42 |

FOREIGN PATENT DOCUMENTS

| | | |
|---|---|---|
| JP | 2002-502711 | 1/2002 |
| JP | 2006-305716 | 11/2006 |
| JP | 2007196346 A * | 8/2007 |
| JP | 2008254129 A * | 10/2008 |
| JP | 2008-544872 | 12/2008 |
| WO | WO 2010098345 A1 * | 9/2010 |
| WO | WO 2010110110 A1 * | 9/2010 |

* cited by examiner (a)

(b)

(a)

(b)

(a)

(b)

(a)

(b)

(c)

(a)

(b)

CUTTING INSERT, CUTTING TOOL, AND METHOD OF CUTTING WORKPIECE USING THE SAME

CROSS-REFERENCE TO THE RELATED APPLICATIONS

This application is a national stage of international application No. PCT/JP2010/054338, filed on Mar. 15, 2010, and claims the benefit of priority under 35 USC 119 to Japanese Patent Application No. 2009-078686, filed on Mar. 27, 2009, the entire contents of which are incorporated herein by reference.

TECHNICAL FIELD

The invention relates to a cutting insert, a cutting tool, and a method of cutting a workpiece using the same.

BACKGROUND ART

As a cutting insert (hereinafter referred to as "insert" in some cases), a cutting insert 20 whose main edge 46 is inclined has heretofore been disclosed in, for example, FIG. 4 of Japanese Unexamined Patent Publication No. 2008-544872. It is preferable to incline the main edge 46 from the standpoint of decreasing cutting resistance.

However, the disadvantage of poor fracture resistance occurs because the thickness of the cutting insert 20 (the distance between a first end face 28 and a second end face 30) is decreased with increase in inclination of the main edge 46.

Hence, there is a demand for a cutting insert exhibiting a low cutting resistance and excellent fracture resistance.

SUMMARY OF THE INVENTION

An advantage of the invention is to provide the cutting insert and the cutting tool which exhibit a low cutting resistance and excellent fracture resistance, as well as the method of cutting a workpiece using the same.

A cutting insert according to an embodiment of the present invention includes an upper face; a lower face; a side face which is located between the upper face and the lower face and includes at least one upper concave portion extending along a thickness direction up to the upper face; and a plurality of divided upper cutting edges which are located at an intersection of the upper face and the side face and are divided by the at least one upper concave portion. Each of the plurality of divided upper cutting edges includes first end located at one end and a second end located at the other end, and is inclined being closer to the lower face from the first end toward the second end when viewed from side. The plurality of divided upper cutting edges include a first divided upper cutting edge and a second divided upper cutting edge adjacent to the second end of the first divided upper cutting edge through the at least one upper concave portion. When viewed from side, the first end of the second divided upper cutting edge is located above an intersection of an extension line extended from the first divided upper cutting edge toward the second divided upper cutting edge, and a line which passes through the first end of the second divided upper cutting edge and is parallel to the central axis of the cutting insert. When viewed from side, the first end of the second divided upper cutting edge is located at the same position as the second end of the first divided upper cutting edge or is located below the second end of the first divided upper cutting edge.

A cutting tool according to an embodiment of the present invention includes the cutting insert; and a holder to which the cutting insert is attached.

A cutting tool according to other embodiment of the present invention includes the plurality of cutting inserts; and a holder to which the plurality of cutting inserts are attached. Two of a plurality of the cutting inserts are attached to the holder with their respective upper faces and their respective lower faces positioned oppositely.

A method of cutting a workpiece according to an embodiment of the present invention includes: rotating the cutting tool around the central axis of the holder; bringing at least one of the plurality of divided upper cutting edges or at least one of the plurality of divided lower cutting edges of the rotating cutting tool into contact with a surface of the workpiece; and separating the cutting tool relatively from the workpiece.

The insert according to the embodiment of the present invention includes the upper concave portion, and is arranged so that the plurality of divided upper cutting edges divided by the upper concave portion are inclined being closer to the lower face from the first end toward the second end. Therefore, this insert achieves a cutting resistance equal to or lower than that of a conventional insert including a cutting edge inclined linearly along a longitudinal direction. When viewed from side, the first end of the second divided upper cutting edge is located at the same position as the second end of the first divided upper cutting edge or is located therebelow. Therefore, when a workplace is cut by attaching the insert to the holder, the first divided upper cutting edge and the second divided upper cutting edge can be applied sequentially to the workpiece, thereby further decreasing the cutting resistance. Additionally, when viewed from side, the first end of the second divided upper cutting edge is located above the intersection of the extension line extending from the first divided upper cutting edge toward the second divided upper cutting edge and the line which passes through the first end of the second divided upper cutting edge and is parallel to the central axis of the cutting insert. Therefore, in the insert including the plurality of divided upper cutting edges inclined as described above, a relatively large thickness between the upper face and the lower face can be ensured, thereby exhibiting excellent fracture resistance.

PREFERRED EMBODIMENTS FOR CARRYING OUT THE INVENTION

<Cutting Insert>

Figure 1:
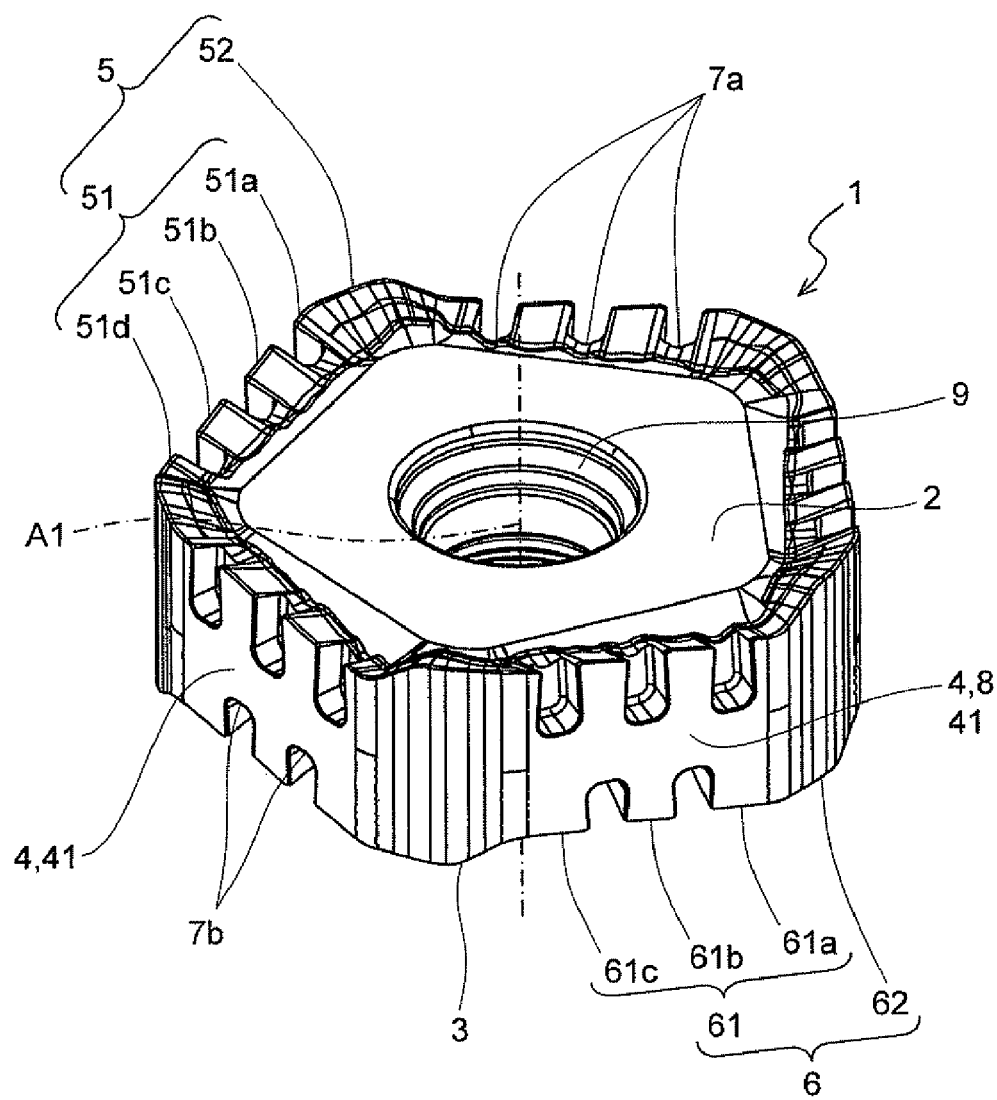
FIG. 1 is a general perspective view showing a cutting insert according to an embodiment of the present invention.
Figure 2:
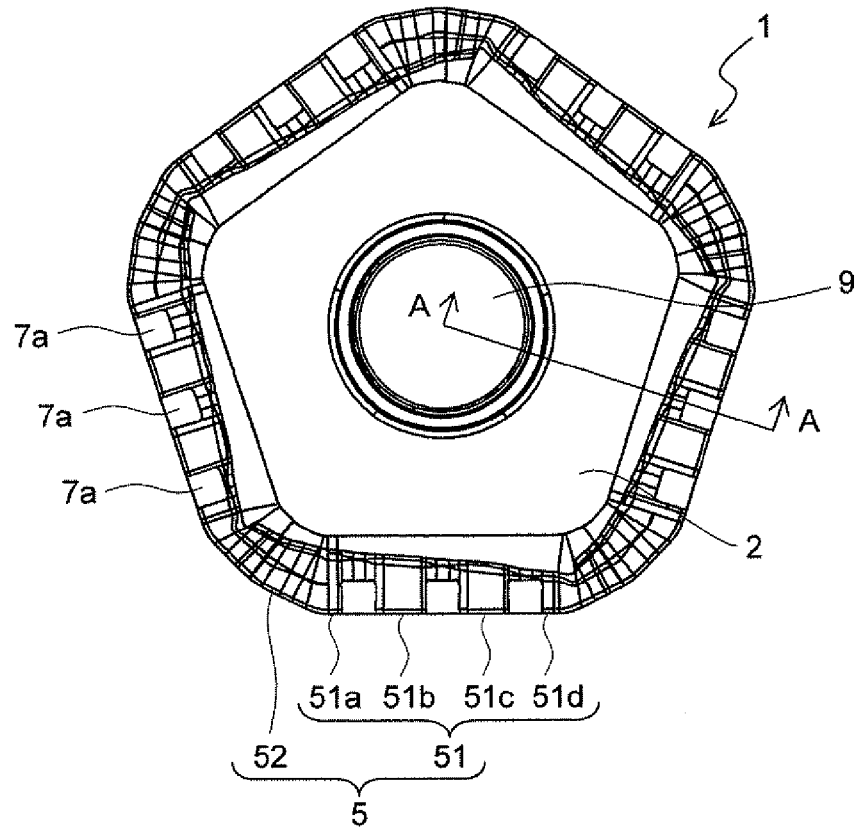
FIG. 2(a) is a top view of the cutting insert shown in FIG. 1.
FIG. 2(b) is a side view thereof.
Figure 2:
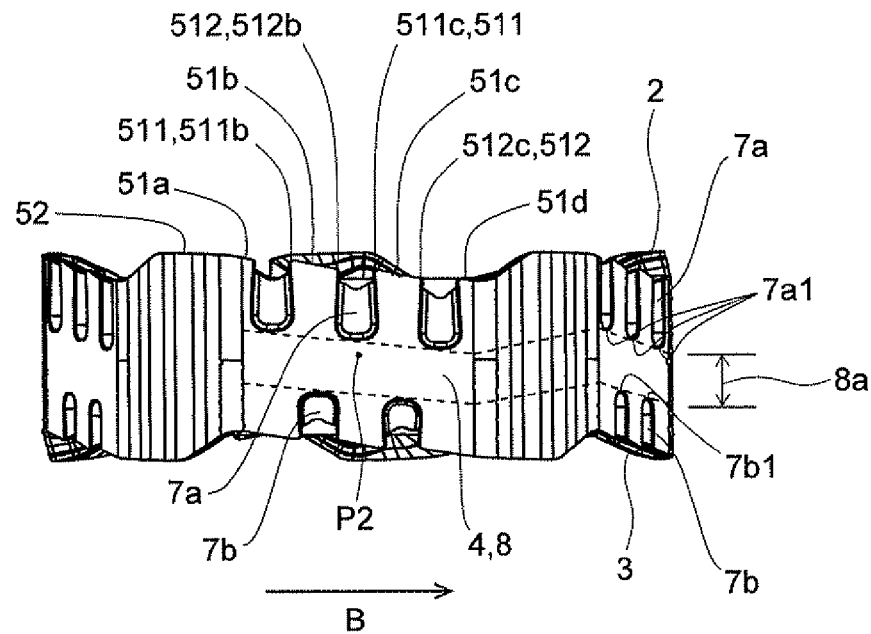

An embodiment of the cutting insert according to the present invention is described in detail with reference to FIGS. 1 to 5. As shown in FIGS. 1 to 2(b), the cutting insert 1 of the present embodiment includes an upper face 2; a lower face 3; a side face 4 connected to the upper face 2 and the lower face 3; a through hole 9 (attachment hole) extending between the upper face 2 and the lower face 3; an upper cutting edge 5 located along an intersection of the upper face 2 and the side face 4; and a lower cutting edge 6 located along an intersection of the lower face 3 and the side face 4. The side face 4 includes at least an upper concave portion 7a which extends up to the upper face 2 along a thickness direction, and divides the upper cutting edge 5 into a plurality of divided upper cutting edges 51a to 51d; at least a lower concave portion 7b which extends up to the lower face 3 along the thickness direction, and divides the lower cutting edge 6 into a plurality of divided lower cutting edges 61a to 61c; and a thick part 8 (side face reinforcing part) being continuous along a width direction. The thickness direction of the side face 4 denotes a direction parallel to a central axis A1 of the insert 1. The width direction of the side face 4 denotes a direction vertical to the thickness direction. The state of being continuous along the width direction of the side face 4 may be the state of being continuous in a direction to extend along the upper cutting edge 5 and the lower cutting edge 6 when viewed from side.

The insert 1 has a body part of a substantially polygonal plate shape. The body part includes the upper face 2 functioning as a rake face, the lower face 3 functioning as a seating surface, and the side face 4 functioning as a flank face. As shown in FIGS. 2(a) and 2(b), the insert 1 is a double sided insert in which both of the upper face 2 and the lower face 3 are usable as a rake face. Therefore, when the lower cutting edge 6 is used, the lower face 3 is used as the rake face, and the upper face 2 is used as the seating surface. That is, the insert 1 of the present embodiment is the double sided insert capable of performing cutting by using the upper cutting edge 5 and the lower cutting edge 6 which are located at both upper and lower faces, respectively. Hereinafter, the individual parts constituting the insert 1 are described in detail.

The body part may have any polygonal shape, and no particular limitation is imposed thereon. When viewed from above, the body part may have a shape that those skilled in the art normally use for inserts, such as triangle, quadrangle, pentagon, hexagon, and octagon. The present embodiment employs a substantially pentagonal shape having five long sides. That is, the insert 1 is a one-sided five-corner use insert. In the shape of the body part, the individual sides thereof have the same length, such as square and regular pentagon, from the viewpoint of using all the sides as a cutting edge. When the body part has a regular pentagonal shape, a large number of cutting edges can be disposed while ensuring the length of the cutting edges, and a plurality of side faces can be used as a contact face with respect to a holder.

A rake face, whose thickness is sequentially decreased from the upper cutting edge 5 and the lower cutting edge 6 toward the inside, is formed on the upper face 2 and the lower face 3, respectively. A through hole 9 extending between the upper face 2 and the lower face 3 is formed in a substantially mid portion of the upper face 2. The central axis of the through hole 9 is located at the same position as the central axis A1 of the body part. The through hole 9 is formed for the purpose of fixing the insert 1 to a holder 91 described later. That is, an attachment screw 92 (fixing member) is inserted into the through hole 9 and then screwed into the holder 91, thereby fixing the insert 1 to the holder 91.

The upper face 2, the lower face 3, and the side face 4 may be coated with titanium nitride (TiN). This improves the hardness, sliding properties, and heat resistance of the insert 1. Preferably, the upper face 2 and the lower face 3 have different colors. For example, when the body part is cemented carbide producing a silver color, either the upper face 2 or the lower face 3 is preferably coated with titanium nitride (TiN) producing a gold color. In a negative-shaped insert, both of the upper face and the lower face function as the rake face, and therefore the insert may be erroneously attached in some cases. When either the upper face or the lower face is coated with TiN, the TiN-coated face and an uncoated face produce different colors, permitting a clear distinct therebetween, thereby reducing a recognition error when attaching the insert. It is unnecessary to coat the entire face of either the upper face 2 or the lower face 3 as a target coating face. For example, a similar effect is obtainable by coating TiN to a part of the target coating face (for example, a region other than the cutting edge). The material used for the coating is not limited to TiN as long as it is possible to recognize a color difference between the upper face 2 and the lower face 3. For example, when the body part is cemented carbide, titanium carbon nitride (TiCN) producing a light reddish brown color, titanium nitride aluminum (TiAlN) producing a dark reddish brown color, or the like may be employed.

The side face 4 is connected to the upper face 2 and the lower face 3, as described above. It is preferable not to provide a clearance angle in the side face 4 for the purpose of reducing deterioration of fracture resistance due to a decrease in the insert thickness. That is, the side face 4 is preferably disposed vertically to the flat seating surfaces formed on the upper face 2 and the lower face 3, respectively. In the present embodiment, the flat seating surfaces are respectively located at the mid portions of the upper face 2 and the lower face 3, and the side face 4 is disposed vertically to these seating surfaces. Thus, the insert 1 has excellent fracture resistance because it ensures a larger thickness of the insert than the insert having a clearance angle between the upper face and the lower face.

The side face 4 includes a plurality of divided side faces 41 respectively connected to individual sides of the substantially polygonal shape of the upper face 2, and at least one upper concave portion 7a is located on each of these divided side faces 41. At least one upper concave portion 7a, and a plurality of divided upper cutting edges 51a to 51d divided by the upper concave portion 7a are formed on the individual divided side faces 41. Hence, as described above, the insert 1 of the present embodiment is the insert for using five corners on each side, in which all the sides of the polygonal shape can be used, namely, a total of 10 corners on both sides are usable for cutting. The term "divided side faces" means the individual side faces 4 connected to the individual sides of the upper face 2. The details of the construction of the side faces 4 are described later.

The upper cutting edge 5 includes a major cutting edge portion 51, and a sub cutting edge portion 52 formed continuously with the major cutting edge portion 51. Similarly to the upper cutting edge 5, the lower cutting edge 6 also includes a major cutting edge portion 61, and a sub cutting edge portion 62. The constructions of the major cutting edge portion 61 and the sub cutting edge portion 62 are identical to those of the major cutting edge portion 51 and the sub cutting edge portion 52. Therefore, the following description is given of the major cutting edge portion 51 and the sub cutting edge portion 52.

The major cutting edge portion 51 is disposed on the outer peripheral side of the holder 91, and is the cutting edge functioning mainly to generate chips in the cutting behavior. The major cutting edge portion 51 includes divided upper cutting edges 51a to 51d (divided major cutting edges) which are divided a plurality of upper concave portions 7a disposed side by side on the side face 4. The sub cutting edge portion 52 is located on the front side of the holder 91, and is formed for the purpose of a flat drag for improving the finished surface accuracy of a workpiece. The sub cutting edge portion 52 is formed at a corner portion of the body part and usually has a linear shape. In some cases, a rounded corner cutting edge is disposed between the major cutting edge portion 51 and the sub cutting edge portion 52. The major cutting edge portion 51 may be parallel to the major cutting edge portion 61 when viewed from side. Similarly, the side cutting edge portion 52 may also be parallel to the sub cutting edge portion 62 when viewed from side.

The major cutting edge portion 51 is inclined to get closer to the lower face 3 toward one direction in a longitudinal direction shown by the arrow B, as shown in FIG. 2(b). Specifically, each of the divided upper cutting edges 51a to 51d has a first end 511 located at one end, and a second end 512 located at the other end. In each of the divided upper cutting edges, the term "one end" means the end located closer to the sub cutting edge portion 52, and the term "the other end" means the end located opposite to the one end. In each of the divided upper cutting edges, a first end 511 is located above a second end 512. The divided upper cutting edges 51a to 51d are inclined to get closer to the lower face 3 from the first end 511 toward the second end 512 when viewed from side. The major cutting edge thus inclined can contribute to a decrease in cutting resistance by using the insert 1 attached to the holder 91 with the rake angle provided with respect to the central axis A2 of the holder 91.

Figure 3:
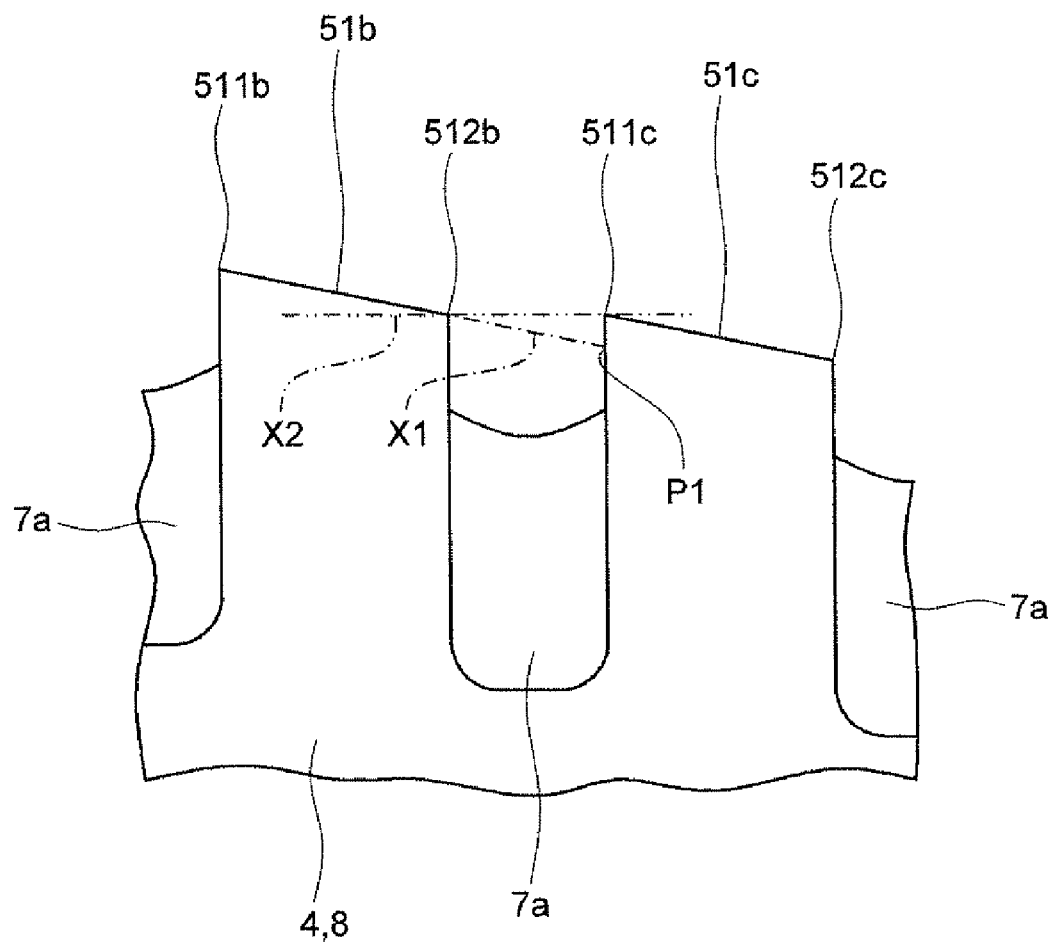
FIG. 3 is a schematic explanatory drawing showing a first divided upper cutting edge and a second divided upper cutting edge of the cutting insert according to the embodiment of the present invention.
Figure 4:
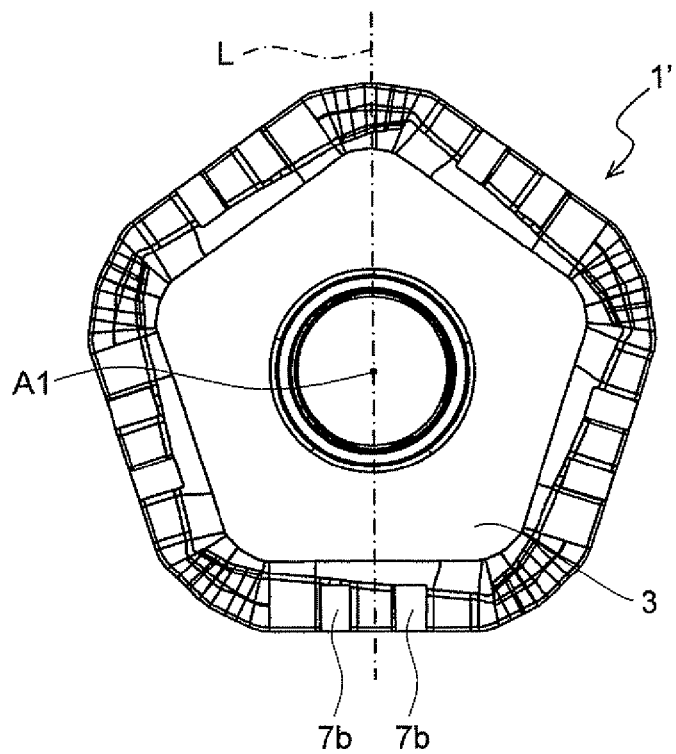
FIG. 4(a) is a diagram showing the cutting insert shown in FIG. 1 after the reversal thereof.
FIG. 4(b) is a diagram showing that before the reversal thereof.
Figure 4:
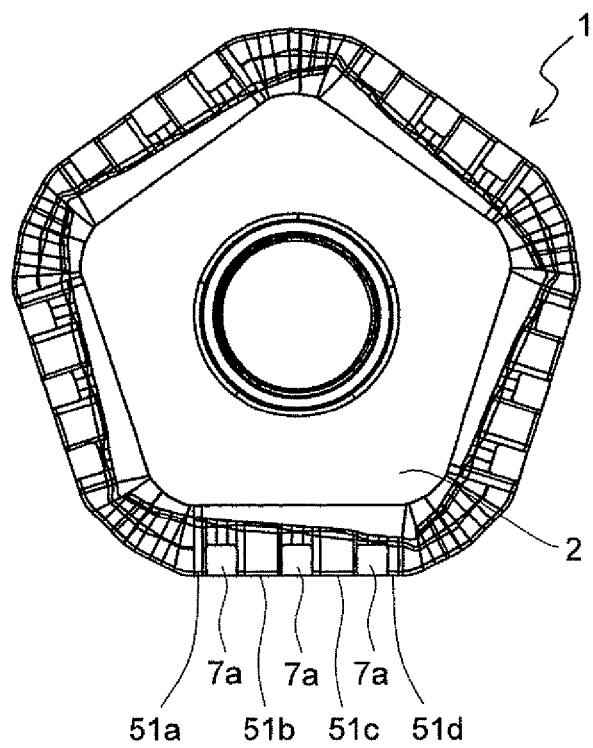

Among the divided upper cutting edges 51a to 51d, the divided upper cutting edge 51b is taken here as a first divided upper cutting edge 51b (an adjacent divided major cutting edge), and the divided upper cutting edge 51c is taken here as a second divided upper cutting edge 51c. As shown in FIG. 3, the second divided upper cutting edge 51c is adjacent to a second end 512b of the first divided upper cutting edge 51b with the upper concave portion 7a interposed therebetween. A first end 511c of the second divided upper cutting edge 51c satisfies the following requirements (I) and (II).

(I) The first end 511c of the second divided upper cutting edge 51c is, when viewed from side, located above an intersection point 91 of an extension line X1 which is extended from the first divided upper cutting edge 51b toward the second divided upper cutting edge 51c (an extension line in the longitudinal direction), and a line which passes through the first end 511c of the second divided upper cutting edge 51c and is parallel to the central axis A1.

(II) The first end 511c of the second divided upper cutting edge 51c is, when viewed from side, located at the same position as the second end 512b of the first divided upper cutting edge 51b, or is located below the second end 512b. Alternatively, a straight line X2 (a third straight line) connecting the first end 511c and the second end 512b is parallel to the seating surface (a horizontal surface), or an angle formed between the straight line X2 and the horizontal surface is smaller than an angle formed between the first divided upper cutting edge 51b and the horizontal surface. In the present embodiment, the first end 511c of the second divided upper cutting edge 51c is, when viewed from side, located at the same position as the second end 512b of the first divided upper cutting edge 51b. The straight line X2 is parallel to the seating surface (the horizontal surface).

When the first end 511c of the second divided upper cutting edge 51c satisfies the requirement (I), it is capable of further ensuring the insert thickness (the distance between the upper face 2 and the lower face 3) than the conventional insert having a cutting edge linearly inclined in the longitudinal direction, thereby exhibiting excellent fracture resistance. When the first end 511c of the second divided upper cutting edge 51c satisfies the requirement (II), it is capable of reducing an increase in cutting resistance due to simultaneous contact of the plurality of divided cutting edges (the first divided upper cutting edge 51b and the second divided upper cutting edge 51c) with the workpiece. When the first end 511c of the second divided upper cutting edge 51c satisfies the requirements (I) and (II), the insert 1 exhibits excellent fracture resistance although it has a low resistance.

On the other hand, the upper concave portion 7a, the lower concave portion 7b, and the thick part 8 are formed in the side face 4 as described above. The upper concave portion 7a is concave from the surface of the side face 4, and is extended in the thickness direction from the lower face 3 toward the upper face 2, and is formed to divide the upper cutting edge 5, specifically the major cutting edge portion 51. The lower concave portion 7b is concave from the surface of the side face 4, and is extended in the thickness direction from the upper face 2 toward the lower face 3, and is formed to divide the lower cutting edge 6, specifically the major cutting edge portion 61. Thereby, the chips generated by the major cutting edge portion 51 or the major cutting edge portion 61 are divided into small pieces in the width direction thereof, thus capable of decreasing the cutting resistance during cutting. As a result, chatter vibration and the cutting edge fracture during machining can be decreased, thereby achieving excellent finished surface accuracy and a long tool life. The insert 1 including the major cutting edge portion 51 and the major cutting edge portion 61 is particularly suitable for heavy cutting.

The upper concave portion 7a and the lower concave portion 7b may be formed to divide the upper cutting edge 5 and the lower cutting edge 6, and no particular limitation is imposed on the constructions thereof. For example, they may extend between the upper face 2 and the lower face 3, or alternatively be formed to dispose their respective ends in the thickness direction (a direction from the upper face toward the lower face). In the present embodiment, the upper concave portion 7a extends between the upper face 2 and the side face 4. The lower concave portion 7b extends between the lower face 3 and the side face 4.

In particular, in the construction including the upper concave portions 7a extending between the upper face 2 and the side face 4, and the lower concave portions 7b extending between the lower face 3 and the side face 4, the ends of these concave portions are preferably disposed closer to the cutting edge divided by the concave portion than the intermediate portion between the upper face 2 and the lower face 3.

That is, these upper concave portion 7a and these lower concave portion 7b have a groove shape with a substantially constant width, and have a linear shape in the thickness direction. The plurality of upper concave portions 7a and the plurality of lower concave portions 7b are separated from one another when viewed from side. Thus, the thick part 8 lying continuously along the width direction can be formed between these upper concave portions 7a and these lower concave portions 7b in the side face 4, thereby achieving excellent fracture resistance.

As shown in FIG. 2(b), each of these upper concave portions 7a has a lower end 7a1 located on the side face 4. Each of these lower concave portions 7b has an upper end 7b1 located on the side face 4. When viewed from side, the lower end 7a1 is located closer to the upper face 2 than the upper end 7b1. Accordingly, the thick part 8 relatively long in the thickness direction can be formed between the upper concave portion 7a and the lower concave portion 7b in the side face 4, thereby achieving more excellent fracture resistance.

These upper concave portions 7a and these lower concave portions 7b are suitably formed depending on an angle at which the insert 1 is attached to the cutting tool. For example, in the case of having the rake face as in the present embodiment, these upper concave portions 7a and these lower concave portions 7b may be disposed horizontally from the rake face toward the side face 4. Alternatively, the bottoms of these upper concave portions 7a and these lower concave portions 7b may be inclined to get closer to the lower face 3 or the upper face 2 as they become closer to the side face 4. The lengths of these upper concave portions 7a and these lower concave portions 7b in the thickness direction may be suitably set depending on the feed per stroke of the cutting tool.

The number of these upper concave portions 7a and the number of these lower concave portions 7b may be suitably set depending on the kind of a workpiece used. As the numbers of these upper concave portions 7a and these lower concave portions 7b are increased, the cutting resistance and the chatter vibration are further decreased, but the cutting area becomes smaller. The number of these upper concave portions 7a and the number of these lower concave portions 7b may be at least one, and normally in the range of about 2 to 6 pieces, preferably 2 to 4 pieces per side face are formed in order to avoid deterioration of the strength of the insert 1 while decreasing the cutting resistance. Preferably, the number of these upper concave portions 7a and the number of these lower concave portions 7b are the same for each side face from the viewpoint of a uniform wear amount of the individual cutting edges during cutting.

The arrangements of these upper concave portions 7a and these lower concave portions 7b may be different depending on the individual cutting edges. For example, a single insert includes a first cutting edge whose concave portion is formed at a predetermined position, and a second cutting edge in which a divided cutting edge is formed at the position of the concave portion of the first cutting edge, and a concave portion is formed at the position of a divided cutting edge of the first cutting edge. In this case, the uncut portions caused by these concave portions can be mutually complemented by alternately disposing these cutting edges along the rotation direction of the holder.

Specifically, as shown in FIGS. 2(b) and 4(a), when reversed by using, as an axis, a reference line L which passes through the intersection point P2 of diagonals of the side face 4 and is vertical to the central axis A1, at least one lower concave portion 7b overlaps, when viewed from above, with at least one of the plurality of divided upper cutting edges 51a to 51d before the reversal thereof shown in FIG. 4(b). More specifically, when reversed using the reference line L as the axis, the entire length of a straight line connecting an intersection of at least one lower concave portion 7b and the first divided lower cutting edge adjacent to this lower concave portion 7b, and an intersection of at least one lower concave portion 7b and the second divided lower cutting edge adjacent to this lower concave portion 7b overlaps with at least one of the plurality of divided upper cutting edges 51a to 51d before the reversal thereof. Thereby, the uncut portions of the workpiece caused by the divided upper cutting edges 51a to 51d and the divided lower cutting edges 61a to 61c can be mutually complemented. Accordingly, the cutting without any uncut portion can be carried out only by the inserts 1 of the same type. Especially, according to the insert 1, the cutting without any uncut portion can be achieved with the inserts 1 of the same type by alternately disposing the upper face of one insert and the lower face of the other insert.

The insert 1 further has the following construction that, when reversed using the reference line L as the axis, at least one lower concave portion 7b, viewed from above, and at least one upper concave portion 7a before the reversal thereof are alternated with a gap interposed therebetween. That is, when reversed using the reference line L as the axis, at least one lower concave portion 7b, viewed from above, does not overlap with at least one upper concave portion 7a before the reversal thereof. Even with this construction, by disposing the insert 1 before the reversal thereof shown in FIG. 4(b), and the insert 1 after the reversal thereof shown in FIG. 4(a) (hereinafter referred to as "reversed insert 1'") along the same circumference of the holder 91, belt-shaped uncut portions generated by the upper concave portion 7a of the insert 1 can be cut by the lower cutting edge 6 of the reversed insert 1'.

When viewed from above, the upper concave portion 7a and the lower concave portion 7b are preferably disposed on each side face 4 so as to be rotationally symmetric with reference to the central axis A1 extending vertically in the thickness direction of the body part. Specifically, the upper recess portion 7a and the lower concave portion 7b formed in each side face 4 are disposed to have the same arrangement when viewed from side. This decreases variations in the life of the cutting edges of the insert 1 and the reversed insert 1', thereby making the replacement timings of all the inserts used for the cutting tool substantially coincide with each other.

The thick part 8 includes the thickness of the insert 1, namely, the central axis A1 of the insert 1, and functions to ensure the distance between a section parallel to the upper cutting edge 5 and the side face 4. By having the thick part 8, it is capable of reducing the conventional disadvantage occurred in the case of forming the groove portion extending between the upper face and the lower face, namely, the deterioration of the fracture resistance of the insert. The insert 1 further includes the through hole 9 extending between the upper face 2 and the lower face 3, as described above. Although the through hole 9 can cause a decrease in the thickness of the insert 1, the fracture resistance deterioration can be effectively reduced even in this insert by including the thick part 8. In the present embodiment, the entire flat surface of the side face 4 except for the upper concave portions 7a and the lower concave portions 7b corresponds to the thick part 8. Preferably, the length of the thick part 8 in the width direction of the side face 4 is larger than the distance between the two adjacent upper concave portions 7a, or the distance between the two adjacent lower concave portions 7b. Owing to the thick part 8 being continuous over such a length, the above effect can be exhibited sufficiently.

Preferably, the thick part 8 is continuous in the width direction of the side face 4, as described above. More preferably, the thick part 8 includes a surface formed linearly in the width direction of the side face 4. As shown in FIG. 2(b), in the present embodiment, the thick part 8 is formed to include a linear (belt-shaped) planar portion 8a (a flat surface) between the upper concave portions 7a and the lower concave portions 7b.

The upper cutting edge 5 includes a linear portion (the major cutting edge portion 51 and the sub cutting edge portion 52). The linear portion is located on an extension line along the thickness direction of the planar portion 8a. The section that includes the central axis A1 and is parallel to the linear portion, and the planar portion 8a are parallel to each other. This reduces fracture resistance deterioration due to a decrease of the thickness of the insert 1.

Preferably, the thick parts 8 located on the individual side faces 4 are formed continuously to each other for the purpose of obtaining more excellent fracture resistance.

Figure 5:
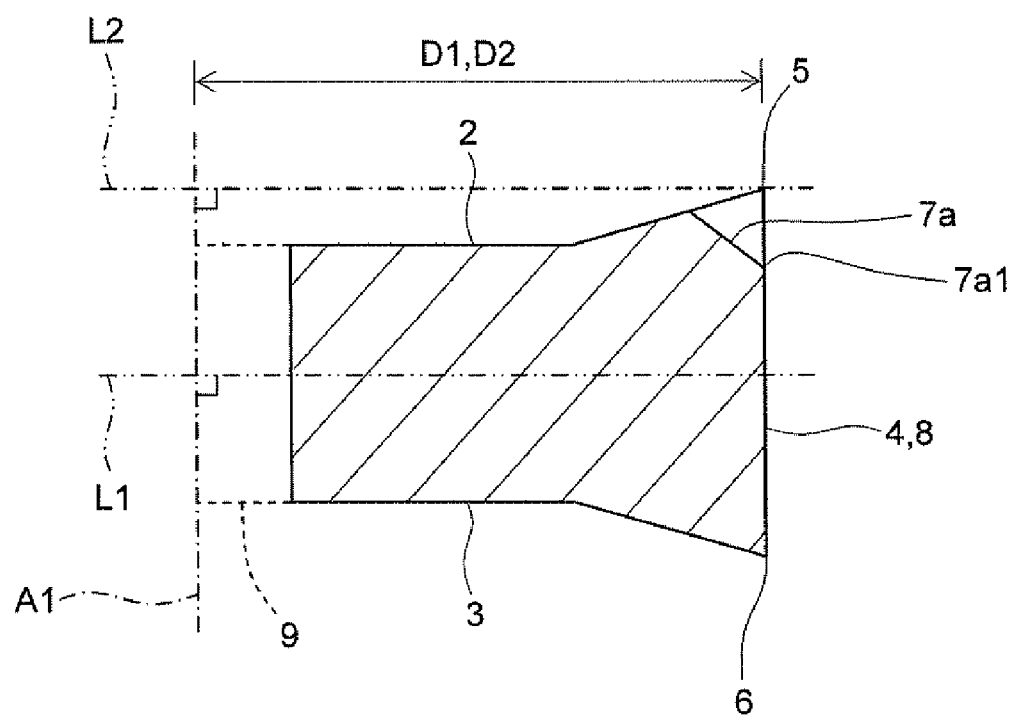
FIG. 5 is a sectional view taken along the line A-A.

As shown in FIG. 5, the thick part 8 preferably satisfies the following relationship: D1=D2, wherein D1 is a distance between the thick part 8 and the central axis A1 in a first straight line L1 that passes through the thick part 8 and is vertical to the central axis A1, and D2 is a distance between the upper cutting edge 5 and the central axis A1 in a second straight line L2 that passes through the upper cutting edge 5 and is vertical to the central axis A1. The first straight line L1 and the second straight line L2 are parallel to each other. The thick part 8 satisfying this relationship enables the insert 1 having excellent fracture resistance. The thick part 8 may protrude outwards than the upper cutting edge 5. That is, the thick part 8 may have the following relationship: D1>D2. In this case, it becomes possible to improve the fracture resistance of the insert 1.

The thick part 8 is preferably formed with respect to one side face 4 at the following ratio. That is, the thick part 8 is preferably formed at the ratio of 60% or more, preferably 60 to 80%, with respect to the entirety of the single side face 4 in the absence of the upper concave portions 7a, the lower concave portions 7b, and the thick part 8. This ensures the thickness of the insert 1.

<Cutting Tool>

Figure 6:
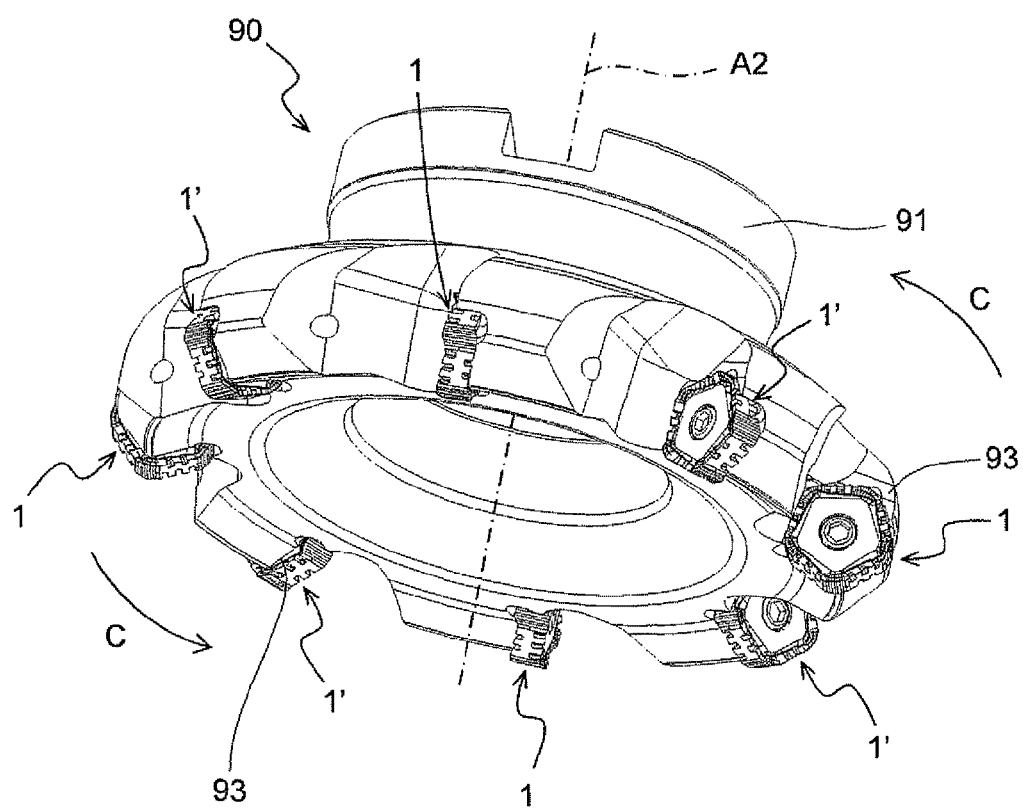
FIG. 6 is a general perspective view showing a cutting tool according to an embodiment of the present invention.
Figure 7:
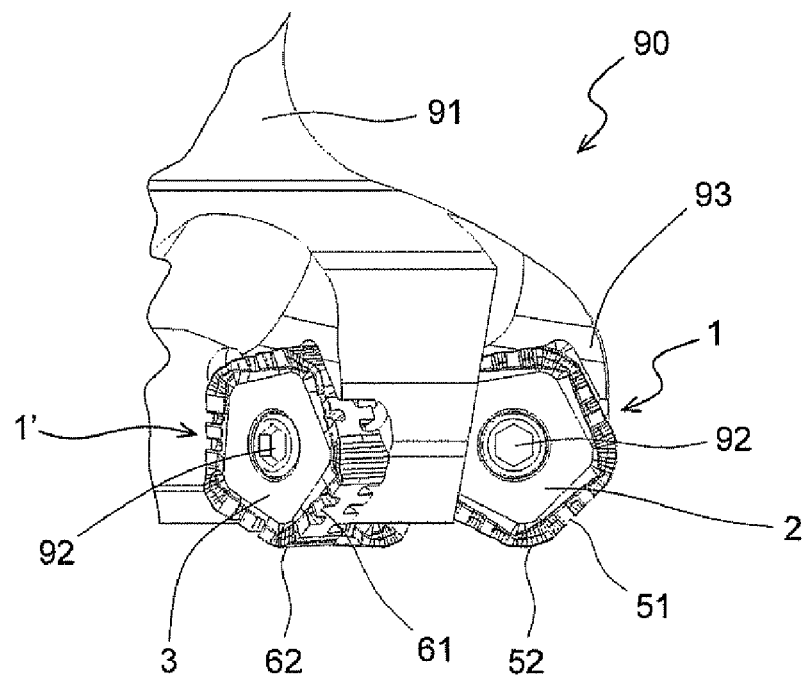
FIGS. 7(a) and 7(b) are partially enlarged side views showing the vicinity of a peripheral front end of the cutting tool shown in FIG. 6.
Figure 7:
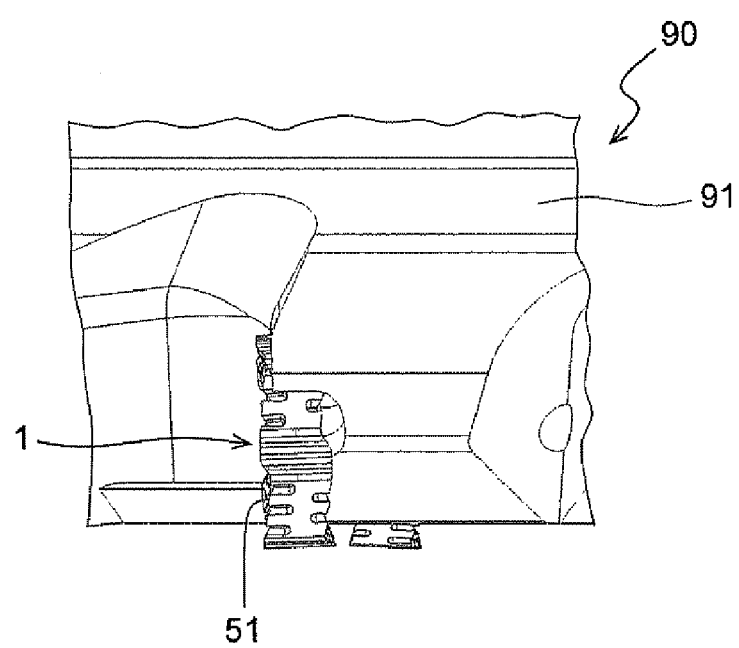
Figure 8:
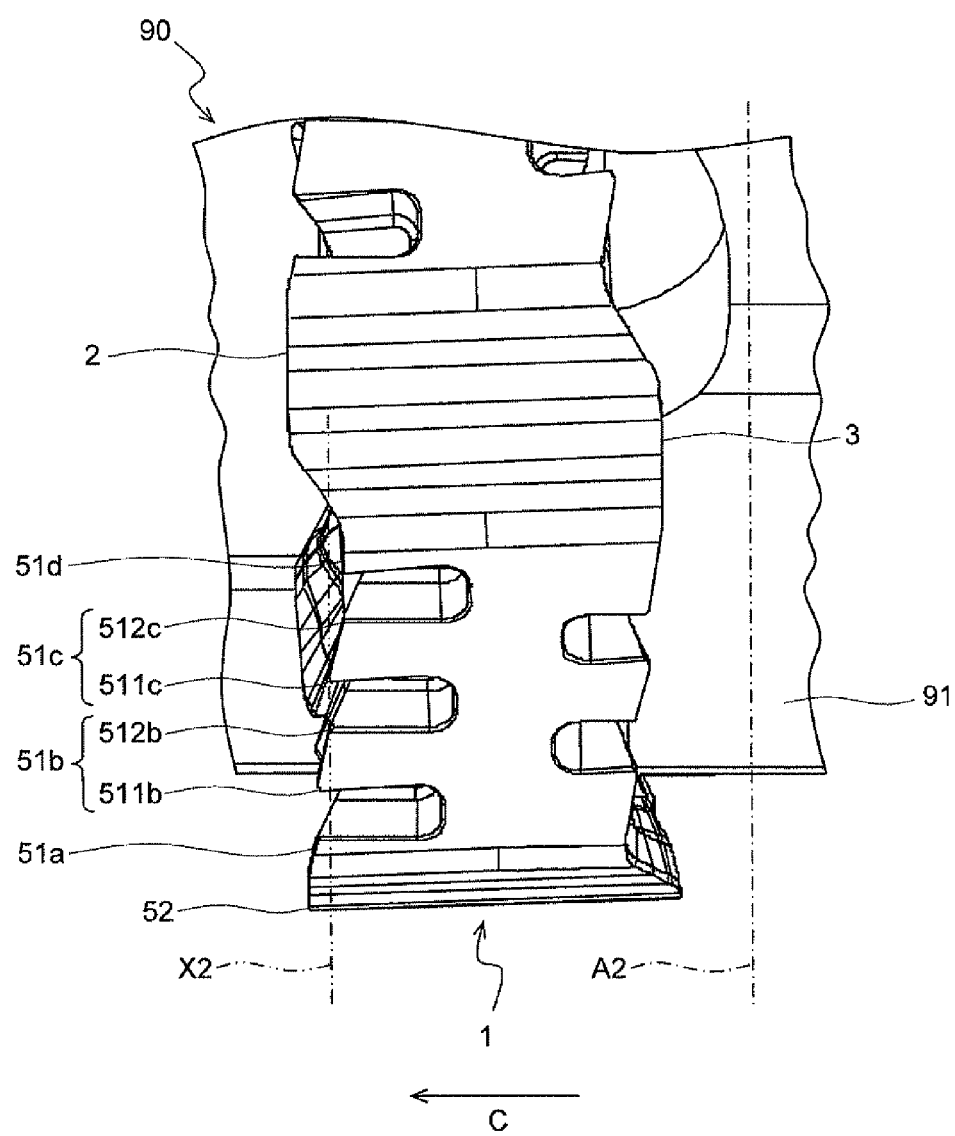
FIG. 8 is a partial enlarged view showing a part of the cutting insert of the cutting tool shown in FIG. 7(b)

An embodiment of the cutting tool of the present invention is described in detail with reference to FIGS. 6 to 8. As shown in FIGS. 6 and 7(a), the cutting tool 90 of the present embodiment includes a plurality of inserts 1, and a holder 91 to which these inserts 1 are attached.

A plurality of insert pockets 93 are formed in the peripheral front end of the holder 10. The inserts 1 are respectively attached to peripheral positions within these insert pockets 93. Specifically, the inserts 1 are attached with their respective upper faces (rake faces) 2 facing in the rotation direction indicated by the arrow C so that the major cutting edge portion 51 is located at the outermost periphery. In the cutting tool 90, the major cutting edge portion 51 performs cutting by rotating the holder 91 in the direction indicated by the arrow C.

As shown in FIG. 7(b), in the cutting tool 90, the inserts 1 are attached to the holder 91 so as to have a positive axial rake angle with the inserts 1 attached thereto, specifically, in the following manner that the sub cutting edge portion 52 of each insert 1 is vertical to the central axis A2 of the holder 91.

Preferably, each insert 1 is attached to the holder 91 so that the plurality of divided cutting edges do not simultaneously contact a workpiece. That is, as shown in FIG. 8, the insert 1 is attached to the holder 91 in a state where a straight line X2 (third straight line) connecting the first end 511c of the second divided upper cutting edge 51c, and the second end 512b of the first divided upper cutting edge 51b is parallel to the central axis A2 of the holder 91, or is inclined in a positive direction, in a perspective side view, namely, in a perspective view from the side face 4.

Here, the state of being inclined in the positive direction means the state where the second end 512b is inclined to be located ahead in the rotational direction indicated by the arrow C than the first end 511c. Therefore, when the insert 1 is attached to the holder 91 in the state as described above, the first end 511c contacts the workpiece coincidentally with the second end 512b, or the first end 511c contacts the workpiece later than the second end 512b, thus permitting the decrease of the cutting resistance. In the present embodiment, the insert 1 is attached to the holder 91 in the state where the straight line X2 is parallel to the central axis A2 of the holder 91, in a perspective view from side, namely, in a perspective view from the side face 4.

As shown in FIGS. 6 and 7(a), the cutting tool 90 is adapted to attach the inserts 1 having different arrangements of the major cutting edge portions along the same circumference of the holder 91. Two inserts 1 and 1 among the plurality of inserts 1 are attached to the holder 91 in a state where their respective upper faces 2 and their respective lower faces 3 are positioned oppositely. That is, the insert 1 whose upper face 2 is oriented in the rotational direction along the same circumference of the holder 91, and the reversed insert 1' whose lower face 3 is oriented in the rotational direction are alternately arranged. Then, the attachment screws 92 (fixing members) are inserted and screwed into the through holes 9 of the insert 1 and the reversed insert 1', respectively, thereby respectively fixing the insert 1 and the reversed insert 1' to the holder 91. Consequently, the belt-shaped uncut portions generated by the upper concave portions 7a of the insert 1 can be cut by the lower cutting edge 6 (the major cutting edge portion 61) of the reversed insert 1', thus permitting the cutting without causing the uncut portions. The number of the inserts arranged along the same circumference may be at least one for the insert 1 and at least one for the reversed insert 1'. Preferably, the number of the inserts is usually a multiple of 2.

<Method of Cutting Workpiece (Method of Manufacturing Cut Product)>

Figure 9:
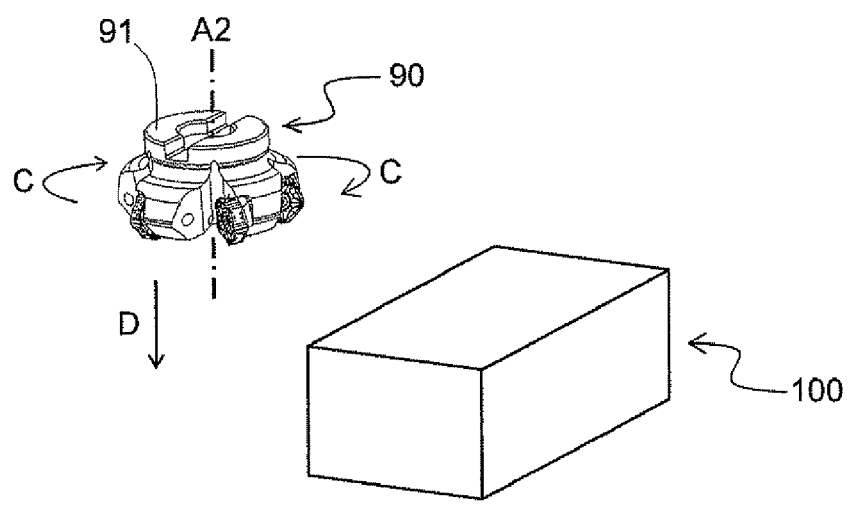
FIGS. 9(a) to 9(c) are process drawings showing a method of cutting a workpiece according to an embodiment of the present invention.
Figure 9:
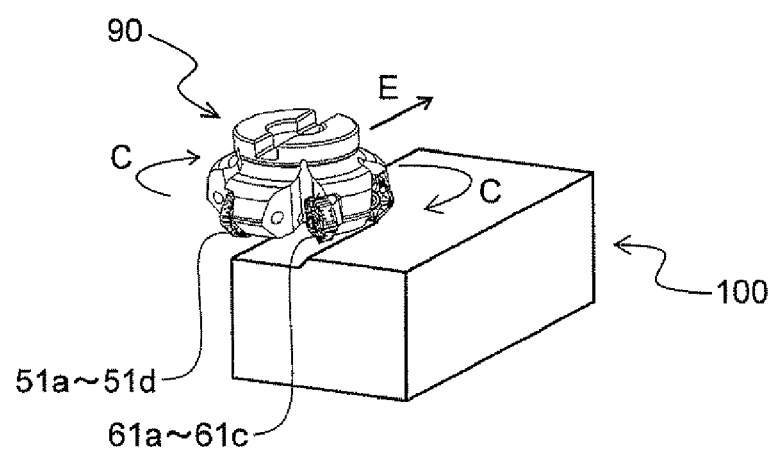
Figure 9:
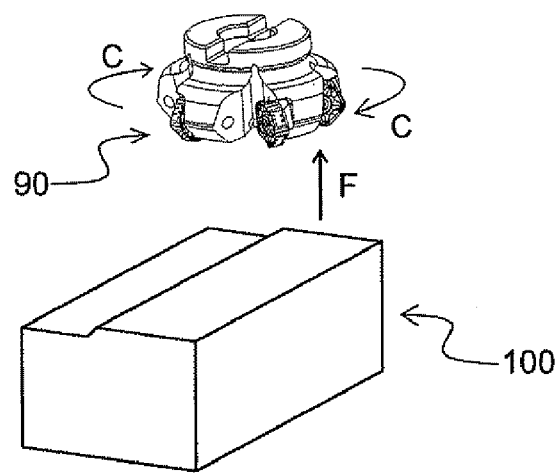

An embodiment of the method of cutting a workpiece according to the invention is described in detail with reference to FIGS. 9(a) to 9(c). The method of cutting the workpiece of the present embodiment includes the following steps (i) to (iii):

(i) the step of bringing the cutting tool 90 near the workpiece 100 by rotating the cutting tool 90 in 5. the direction indicated by the arrow C around the central axis A2 of the holder 91, and by moving the cutting tool 90 in the direction indicated by the arrow D, as shown in FIG. 9(a);

(ii) the step of cutting the workpiece 100 by bringing at least one of the plurality of divided upper cutting edges 51a to 51d and at least one of the plurality of divided lower cutting edges 61a to 61c of the rotating cutting tool 90 into contact with the surface of the workpiece 100, and by moving the cutting tool 90 in the direction indicated by the arrow E, as shown in FIG. 9(b); and (iii) the step of separating the cutting tool 90 relatively from the workpiece 100 by moving the cutting tool 90 in the direction indicated by the arrow F, as shown in FIG. 9(c).

In the present embodiment, the workpiece 100 is cut by using the cutting tool 90 with the inserts 1 attached thereto. Therefore, in the step (ii), the cutting resistance during cutting can be decreased, and the chatter vibration during machining can be decreased. The machining can be carried out with the inserts of the same type without causing the uncut portion.

In the step (i), either the cutting tool 90 or the workpiece 100 may be rotated. The workpiece 100 and the cutting tool 90 may be relatively close to each other. For example, the workpiece 100 may be brought near the cutting tool 90. Similarly, in the step (iii), the workplace 100 and the cutting tool 10 may be relatively separated from each other. For example, the workpiece 100 may be moved away from the cutting tool 90. When the cutting is continued, the step of bringing the divided upper cutting edges 51a to 51d and the divided lower cutting edges 61a to 61c of the cutting tool 90 into contact with different portion of the workpiece 100 may be repeated while keeping the cutting tool 90 rotating. When the divided upper cutting edges 51a to 51d in use and the divided lower cutting edges 61a to 61c in use are worn, the unused divided upper cutting edges 51a to 51d and the unused divided lower cutting edges 61a to 61c may be used by rotating the insert 1 and the reversed insert 1' 90 degrees with respect to the central axis A1.

While the several embodiments according to the present invention have been described and illustrated above, it is to be understood that the present invention is not limited to these embodiments and applicable to any optional embodiments without departing from the gist of the present invention.

Figure 10:
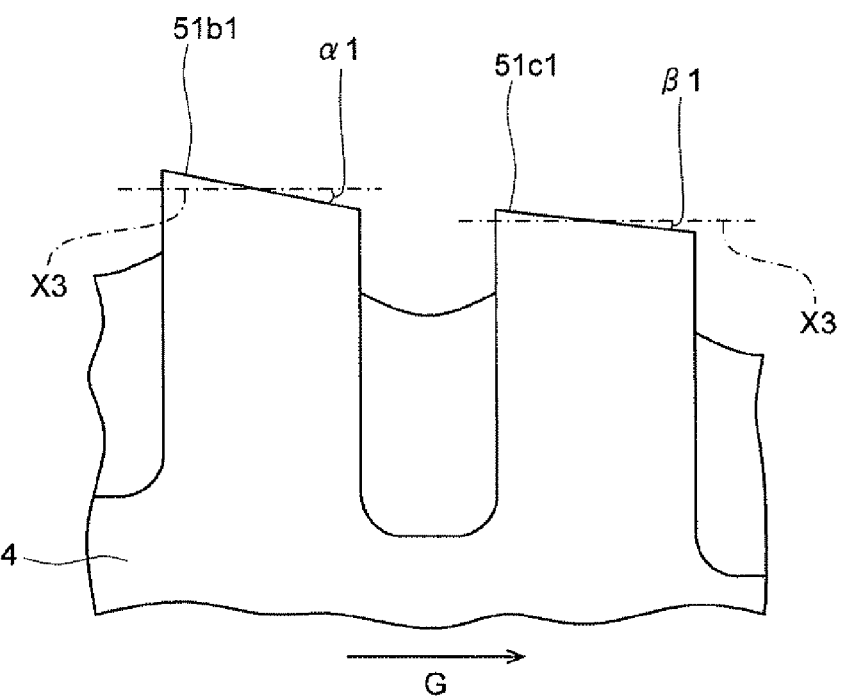
FIGS. 10(a) and 10(b) are schematic explanatory drawings showing a first divided upper cutting edge and a second divided upper cutting edge of the cutting insert according to other embodiment of the present invention.
Figure 10:
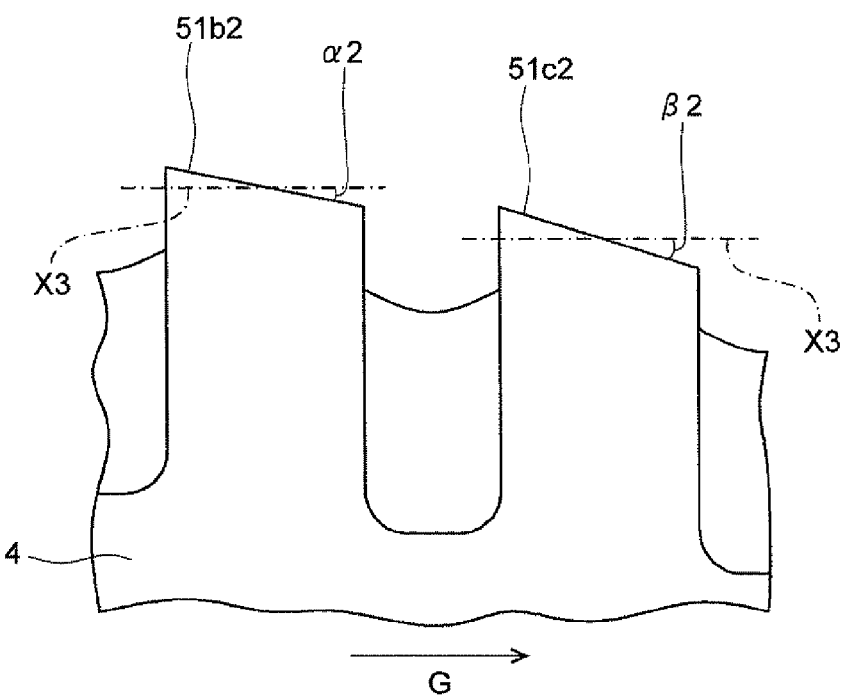

For example, in the inserts according to the earlier described embodiment, the plurality of divided upper cutting edges are straight lines, and when viewed from side, the inclination angles of these divided upper cutting edges (these straight lines) with reference to a plane vertical to the central axis A1 are constant in a direction from the first divided upper cutting edge toward the second divided upper cutting edge on the side face. Alternatively, the inclination angles of these divided upper cutting edges (these straight lines) may be formed at the angles as shown in FIGS. 10(a) and 10(b). That is, as shown in FIG. 10(a), a first divided upper cutting edge 51b1 and a second divided upper cutting edge 51c1 of this embodiment are straight lines. When viewed from side, namely, in a perspective view from the side face 4, $\alpha 1$ and $\beta 1$ are decreased from the first divided upper cutting edge 51b1 to the second divided upper cutting edge 51c1 on the side face 4, namely, in the direction as shown by the arrow G, wherein $\alpha 1$ is an inclination angle of the first divided upper cutting edge 51b1 with reference to a plane X3 vertical to the central axis A1, and $\beta 1$ is an inclination angle of the second divided upper cutting edge 51c1 with reference to a straight line X3. That is, $\alpha 1$ and $\beta 1$ have the following relationship: $\alpha 1 > \beta 1$. This ensures the insert thickness correspondingly to a decrease in the $\beta 1$ of the second divided upper cutting edge 51c1, thereby exhibiting more excellent fracture resistance. Other constructions are similar to those of the insert according to the earlier described embodiment.

Alternatively, as shown in FIG. 10(b), a first divided upper cutting edge 51b2 and a second divided upper cutting edge 51c2 according to this embodiment are straight lines. When viewed from side, $\alpha 2$ and $\beta 2$ are increased in the direction indicated by the arrow G, wherein $\alpha 2$ is an inclination angle of the first divided upper cutting edge 51b2 with reference to the plane X3, and $\beta 2$ is an inclination angle of the second divided upper cutting edge 51c2 with reference to the straight line X3. That is, $\alpha 2$ and $\beta 2$ have the following relationship: $\alpha 2 < \beta 2$. This increases the axial rake angle during attachment to the holder 91, thereby decreasing cutting resistance. Other constructions are similar to those of the insert according to the earlier described embodiment.

Figure 11:
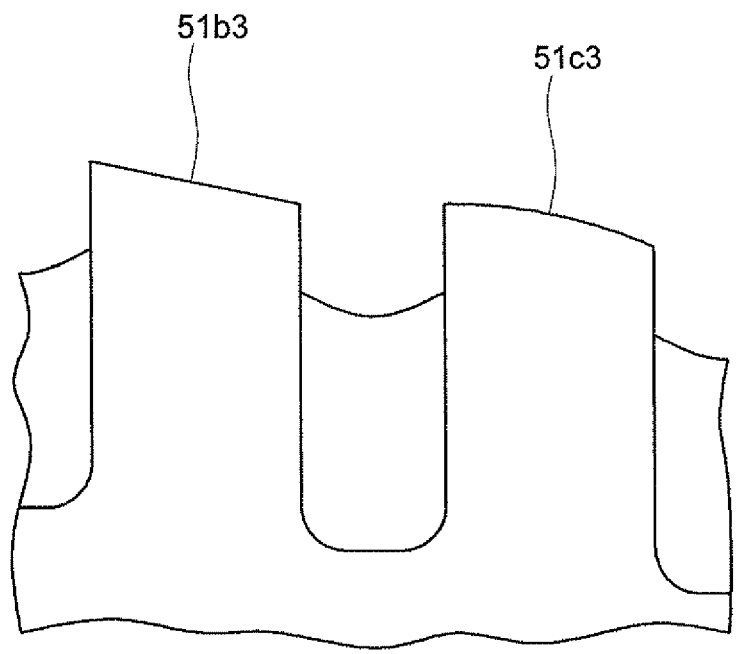
FIGS. 11(a) and 11(b) are schematic explanatory drawings showing a first divided upper cutting edge and a second divided upper cutting edge of the cutting insert according to a still other embodiment of the present invention.
Figure 11:
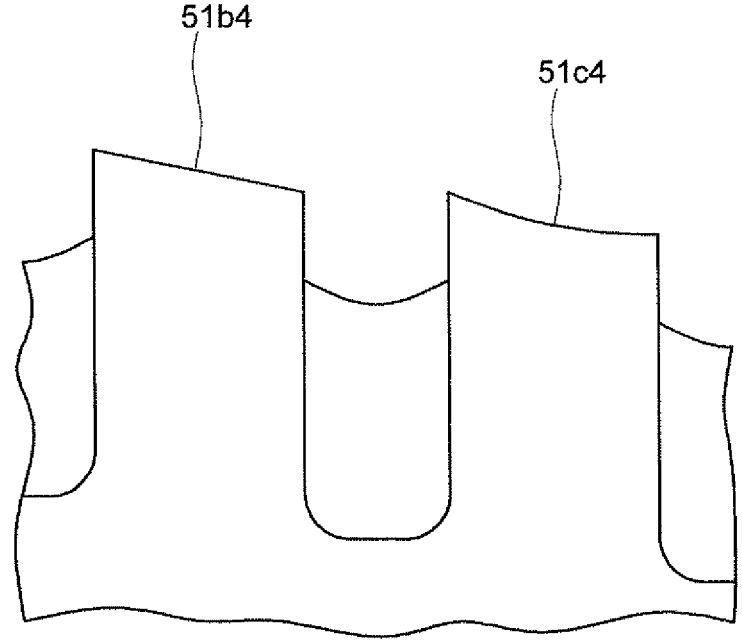

In the inserts according to the earlier described embodiment, the plurality of divided upper cutting edges are the straight lines. Alternatively, at least one of these divided upper cutting edges may be formed in, for example, a shape as shown in FIGS. 11(a) and 11(b). That is, as shown in FIG. 11(a), the insert according to this embodiment includes a first divided upper cutting edge 51b3 and a second divided upper cutting edge 51c3. In these first and second upper cutting edges 51b3 and 51c3, the second divided upper cutting edge 51c3 is a curved line protruding upward. The front end sides of these divided upper cutting edges are most susceptible to load during cutting. Therefore, by forming the divided upper cutting edge into the curved line protruding upward, the thickness of the insert at the front end can be increased, thereby improving fracture resistance. This embodiment is adapted to improve the fracture resistance of the second divided upper cutting. Alternatively, all of these divided upper cutting edges may be curved lines protruding upward, thereby further improving the fracture resistance. Other constructions are similar to those of the insert according to the earlier described embodiment.

Alternatively, the insert as shown in FIG. 11(b) includes a first divided upper cutting edge 51b4 and a second divided upper cutting edge 51c4. In these first and second upper cutting edges 51b4 and 51c4, the second divided upper cutting edge 51c4 is a curved line protruding downward. This increases the axial rake angle during attachment to the holder 91, thereby decreasing cutting resistance and improving chip discharge performance. Other constructions are similar to those of the insert according to the earlier described embodiment. Alternatively, all of the plurality of divided upper cutting edges may be curved lines protruding downward, thereby further decreasing the fracture resistance and further improving the chip discharge performance.

Figure 12:
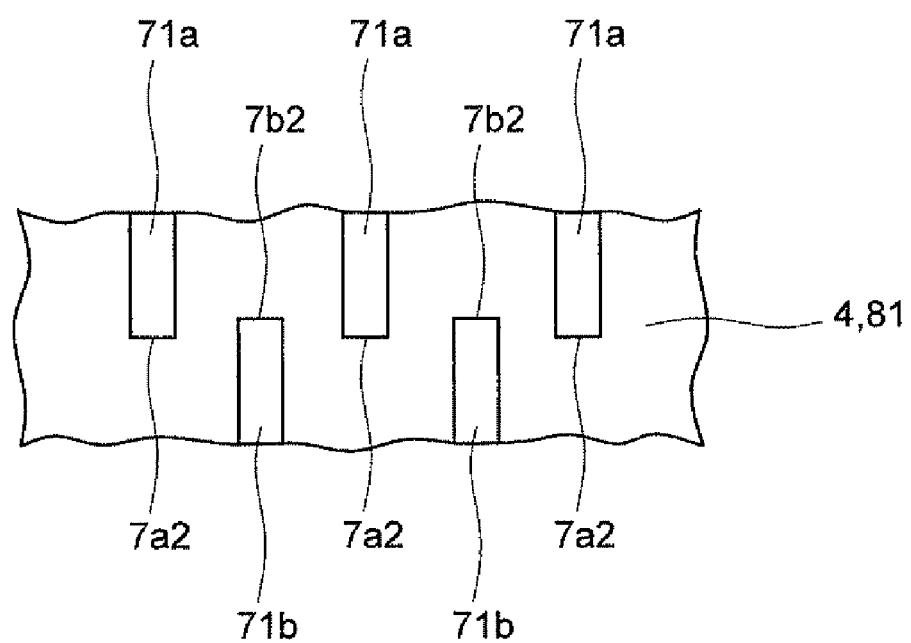
FIG. 12 is a partially enlarged side view showing the vicinity of a side face of the cutting insert according to the still other embodiment of the present invention.

On the other hand, the insert according to the earlier described embodiment, when viewed from side, the lower ends of the upper concave portions are located closer to the upper face than the upper ends of the lower concave portions. Alternatively, when viewed from side, the lower ends of the upper concave portions may be located closer to the lower face than the upper ends of the lower concave portions. That is, as shown in FIG. 12, in the insert according to this embodiment, each of the upper recesses portions 71a has a lower end 7a2 located on the side face 4, and each of the lower concave portions 71b has an upper end 7b2 located on the side face 4. When viewed from side, these lower ends 7a2 are located closer to the lower face 3 than these upper ends 7b2. This allows a thick part 81 according to this embodiment to include a curved line region extending wavily from one end to the other end in the width direction of the side face 4. Also in the insert of this embodiment, the thick part 8 is continuous along the width direction of the side face 4, thus achieving the same effect as the insert of the earlier described embodiment. Particularly, it is capable of increasing the lengths of the upper concave portions 71a and the lower concave portions 71b, thereby further improving the chip discharge performance. Other constructions are similar to those of the insert according to the earlier described embodiment.

The invention claimed is:
1. A cutting insert, comprising:
an upper face;
a lower face;
a side face which is located between the upper face and the lower face and comprises at least one upper concave portion extending along a thickness direction up to the upper face; and a plurality of divided upper cutting edges which are located at an intersection of the upper face and the side face and are divided by the at least one upper concave portion, wherein each of the plurality of divided upper cutting edges comprises a first end located at one end and a second end located at the other end, and is inclined being closer to the lower face from the first end toward the second end when viewed from side, the plurality of divided upper cutting edges comprise a first divided upper cutting edge, and a second divided upper cutting edge adjacent to the second end of the first divided upper cutting edge through the at least one upper concave portion, when viewed from side, the first end of the second divided upper cutting edge is located above an intersection of an extension line extended from the first divided upper cutting edge toward the second divided upper cutting edge, and a line which passes through the first end of the second divided upper cutting edge and is parallel to the central axis of the cutting insert, and when viewed from side, the first end of the second divided upper cutting edge is located at the same position as the second end of the first divided upper cutting edge or is located below the second end of the first divided upper cutting edge.

2. The cutting insert according to claim 1, wherein
the plurality of divided upper cutting edges are respectively straight lines, and when viewed from side, the plurality of divided upper cutting edges have a following relationship:
inclination angles of their respective straight lines with reference to a perpendicular of the central axis decrease sequentially from the first divided upper cutting edge side toward the second divided upper cutting edge.

3. The cutting insert according to claim 1, wherein
the plurality of divided upper cutting edges are respectively straight lines, and when viewed from side, the plurality of divided upper cutting edges have a following relationship: inclination angles of their respective straight lines with reference to a perpendicular of the central axis increase sequentially from the first divided upper cutting edge toward the second divided upper cutting edge.

4. The cutting insert according to claim 1, wherein
when viewed from side, at least one of the plurality of divided upper cutting edges is a curved line protruding upward.

5. The cutting insert according to claim 1, wherein
when viewed from side, at least one of the plurality of divided upper cutting edges is a curved line protruding downward.

6. The cutting insert according to claim 1,
wherein the side face further comprises at least one lower concave portion extending along a thickness direction up to the lower face, and
the cutting insert further comprises:
a plurality of divided lower cutting edges which are located at an intersection of the lower face and the side face and are divided by the at least one lower concave portion.

7. The cutting insert according to claim 1, wherein
the side face further comprises a thick part being continuous along a width direction of the side face,
the at least one upper concave portion and the at least one lower concave portion are separated from each other through the thick part being continuous along the width direction of the side face, and D1 and D2 have a relationship of D1≧D2, wherein D1 is a distance between the thick part and the central axis in a first straight line which passes through the thick part and is vertical to the central axis, and D2 is a distance between the at least one of the plurality of divided upper cutting edges and the central axis in a second straight line which passes through the at least one of the plurality of divided upper cutting edges, is vertical to the central axis, and is parallel to the first straight line.

8. The cutting insert according to claim 7, wherein
the plurality of divided upper cutting edges comprise a linear portion,
the thick part comprises a planar portion,
the linear portion is located on an extension line along a thickness direction of the planar portion, and
a section which includes the central axis and is parallel to the linear portion, and the planar portion are parallel to each other.

9. The cutting insert according to claim 7, wherein
the at least one upper concave portion comprises a lower end located on the side face,
the at least one lower concave portion comprises an upper end located on the side face, and
when viewed from side, the lower end is located closer to the upper face than the upper end, and the thick part is located between the upper end and the lower end.

10. The cutting insert according to claim 7 wherein
the at least one upper concave portion comprises a lower end located on the side face,
the at least one lower concave portion comprises an upper end located on the side face, and
when viewed from side, the lower end is located closer to the lower face than the upper end.

11. The cutting insert according to claim 6, wherein
in a top view, when the cutting insert is reversed around a reference line as an axis which passes through an intersection point of diagonals of the side face and is vertical to the central axis, the at least one lower concave portion overlaps with at least one of the plurality of divided upper cutting edges before the reversal thereof.

12. The cutting insert according to claim 6, wherein
in a top view, when the cutting insert is reversed around the reference line as an axis, the lower concave portion and the at least one upper concave portion are alternately located with a gap interposed therebetween.

13. The cutting insert according to claim 6, wherein the upper face and the lower face have different colors.

14. The cutting insert according to claim 1, wherein
the upper face has a substantially polygonal shape,
the side face comprises a plurality of divided side faces respectively connected to sides of the substantially polygonal shape of the upper face,
the at least one upper concave portion comprises a plurality of upper concave portions, and
at least one of the plurality of upper concave portions and the plurality of divided upper cutting edges divided by the at least one of the plurality of upper concave portions are located on each of the plurality of divided side faces.

15. A cutting tool, comprising:
a cutting insert according to claim 1; and
a holder to which the cutting insert is attached.

16. The cutting tool according to claim 15, wherein the cutting insert further comprises a through hole extending between the upper face and the lower face, and is attached to the holder by using a fixing member inserted into the through hole.

17. The cutting tool according to claim 15, wherein in a perspective view from the side face, the cutting insert is attached to the holder in a state where a third straight line connecting the first end of the second divided upper cutting edge and the second end of the first divided upper cutting edge is parallel to the central axis of the holder or is inclined in a positive direction with respect to the central axis of the holder.

18. A cutting tool, comprising: a plurality of cutting inserts according to claim 1; and a holder to which the plurality of cutting inserts are attached, wherein two of the plurality of cutting inserts are attached to the holder in a state where their respective upper faces and their respective lower faces are positioned oppositely, and when viewed along, the same circumference of the holder, the at least one lower concave portion of one of the two cutting inserts and the at least one upper concave portion of the other cutting insert are alternately located with a gap interposed therebetween.

19. A method of cutting a workpiece, comprising:
rotating a cutting tool according to claim 15 around the central axis of the holder;
bringing at least one of the plurality of divided upper cutting edges or at least one of the plurality of divided lower cutting edges of the rotating cutting tool into contact with a surface of the workpiece; and
separating the cutting tool relatively from the workpiece.

\* \* \* \* \*